(12) United States Patent
Rajagopal et al.

(10) Patent No.: US 11,968,263 B2
(45) Date of Patent: Apr. 23, 2024

(54) BEHIND-THE-METER RESOURCE MANAGEMENT SYSTEM

(71) Applicant: The Board of Trustees of the Leland Stanford Junior University, Stanford, CA (US)

(72) Inventors: Ram Rajagopal, Stanford, CA (US); Gustavo Vianna Cezar, Stanford, CA (US); Thomas Navidi, Stanford, CA (US); Elizabeth Buechler, Stanford, CA (US); Abbas El Gamal, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 17/703,621

(22) Filed: Mar. 24, 2022

(65) Prior Publication Data
US 2022/0321664 A1  Oct. 6, 2022

Related U.S. Application Data

(60) Provisional application No. 63/165,378, filed on Mar. 24, 2021.

(51) Int. Cl.
*H04L 67/125* (2022.01)
*H02J 3/00* (2006.01)

(52) U.S. Cl.
CPC ............ *H04L 67/125* (2013.01); *H02J 3/003* (2020.01)

(58) Field of Classification Search
CPC .................. H04L 67/125; H02J 3/003
USPC .......................................... 709/224
See application file for complete search history.

(56) References Cited

U.S. PATENT DOCUMENTS

| | | |
|---|---|---|
| 10,241,528 B1 | 3/2019 | Frader-Thompson et al. |
| 10,606,296 B2 | 3/2020 | Mokhtari et al. |
| 10,756,543 B2 | 8/2020 | Detmers et al. |
| 10,770,897 B1 | 9/2020 | Hertz-Shargel et al. |
| 2011/0231028 A1 | 9/2011 | Ozog |
| 2014/0343983 A1 | 11/2014 | Narayan et al. |
| 2015/0134280 A1 | 5/2015 | Narayan et al. |

(Continued)

OTHER PUBLICATIONS

Bayram, I.S. et al. (May 2017). "A survey on behind the meter energy management systems in smart grid," Renewable and Sustainable Energy Reviews 72:1208-1232.

(Continued)

*Primary Examiner* — Frantz B Jean
(74) *Attorney, Agent, or Firm* — Mintz Levin Cohn Ferris Glovsky and Popeo, P.C.

(57) ABSTRACT

A method and a system for managing power resources. One or more measurements received from one or more sensors communicatively coupled to at least one processor are processed. The sensors monitor and measure at least one of: one or more operational parameters associated with operation of at least one equipment, one or more external parameters associated with an environment of the equipment, and one or more power parameters associated with a power consumption by the equipment. Based on the processed one or more measurements, one or more future operational parameters associated with an operation of the are determined. The operation of the equipment is controlled using the determined future operational parameters.

19 Claims, 8 Drawing Sheets

(56) References Cited

U.S. PATENT DOCUMENTS

| | | | |
|---|---|---|---|
| 2017/0025894 A1 | 1/2017 | Sanders et al. | |
| 2018/0366978 A1* | 12/2018 | Matan | G05B 19/042 |
| 2020/0076196 A1* | 3/2020 | Lee | H02J 3/008 |
| 2021/0224721 A1* | 7/2021 | Morgenthau | H04Q 9/00 |
| 2022/0060017 A1* | 2/2022 | Lewin | H02J 3/003 |

OTHER PUBLICATIONS

Chen, Z. et al. (2012). "Real-time price-based demand response management for residential appliances via stochastic optimization and robust optimization," *IEEE Transactions on Smart Grid* 3(4):1822-1831.

Leitao, J. et al. (2019). "A survey on home energy management," *IEEE Access* 8:5699-5722.

Olivares, D.E. et al. (Jul. 2014). "Trends in microgrid control," *IEEE Transactions on Smart Grid* 5(4):1905-1919.

Vivekananthan, C. et al. (2015). "Real-time price based home energy management scheduler," IEEE Transactions on Power Systems 30(4):2149-2159.

Xu, X. et al. "(Feb. 2020). A multi-agent reinforcement learning-based data-driven method for home energy management," *IEEE Transactions on Smart Grid* 11:3201-3211.

Ye, Y. et al. (Jul. 2020). "Model-free real-time autonomous control for a residential multi-energy system using deep reinforcement learning," *IEEE Transactions on Smart Grid* 11(4):3068-3082.

Z. Yu, L. Jia, M. C. Murphy-Hoye, A. Pratt, L. Tong, Modeling and stochastic control for home energy management, IEEE Transactions on Smart Grid 4 (2013) 2244-2255.

M. A. A. Pedrasa, T. D. Spooner, I. F. MacGill, Coordinated scheduling of residential distributed energy resources to optimize smart home energy services, IEEE Transactions on Smart Grid 1 (2010) 134-143.

Q. Hu, F. Li, Hardware design of smart home energy management system with dynamic price response, IEEE Transactions on Smart Grid 4 (2013) 1878-1887.

X. Jin, K. Baker, S. Isley, D. Chritensen, User-preference-driven model predictive control of residential building loads and battery storage for demand response, American Control Conference (2017).

R. Batchu, N. M. Pindoriya, Residential demand response algorithms: State-of-the-art, key issues and challenges, Springer International Publishing, WiSATS 2015 (2015) 18-32.

M. Zheng, C. J. Meinrenken, K. S. Lackner, Electricity storage in buildings for residential sector demand response: Control algorithms and economic viability evaluation, Tech. Rep. NIST GCR 14-978 (2014).

T. Navidi, A. El Gamal, R. Rajagopal, A two-layer decentralized control architecture for der coordination, in: 2018 IEEE Conference on Decision and Control, 2018, pp. 6019-6024.

S. Lee, B. Kwon, S. Lee, Joint energy management system of electric supply and demand in houses and buildings, IEEE Transactions on Power Systems 29 (2014) 2804-2812.

E. Mocanu, D. C. Mocanu, P. H. Nguyen, A. Liotta, M. E. Webber, M. Gibescu, J. G. Slootweg, On-line building energy optimization using deep reinforcement learning, IEEE Transactions on Smart Grid 10 (2019) 3698-3708.

A. Ahmad, J. Y. Khan, Real-time load scheduling, energy storage control and comfort management for grid-connected solar integrated smart buildings, Applied Energy 259 (2020) 114208. Located at http://www.sciencedirect.com/science/article/pii/S0306261919318951.

D. Thomas, O. Deblecker, C. S. Ioakimidis, Optimal operation of an energy management system for a grid-connected smart building considering photovoltaics' uncertainty and stochastic electric vehicles' driving schedule, Applied Energy 210 (2018) 1188-1206. Located at http://www.sciencedirect.com/science/article/pii/S0306261917309078.

N. Delgarm, B. Sajadi, F. Kowsary, S. Delgarm, Multi-objective optimization of the building energy performance: A simulation-based approach by means of particle swarm optimization (pso), Applied Energy 170 (2016) 293-303. URL: http://www.sciencedirect.com/science/article/pii/S030626191630304X. doi:https://doi.org/10.1016/j.apenergy.2016.02.141.

A. Anvari-Moghaddam, A. Rahimi-Kian, M. S. Mirian, J. M. Guerrero, A multi-agent based energy management solution for integrated buildings and microgrid system, Applied Energy 203 (2017) 41-56. URL: http://www.sciencedirect.com/science/article/pii/S0306261917307572. doi:https://doi.org/10.1016/j.apenergy.2017.06.007.

Y. Chen, V. Chandna, Y. Huang, M. Alam, O. Ahmed, L. Smith, Coordination of behind-the-meter energy storage and building loads: Optimization with deep learning model, e-Energy '19: Proceedings of the Tenth ACM International Conference on Future Energy Systems (2019) 492-499. doi:10.1145/3307772.3331025.

I. Hussain, S. Mohsin, A. Basit, Z. A. Khan, U. Qasim, N. Javaid, A review on demand response: Pricing optimization and appliance scheduling, Procedia Computer Science (2015) 843-850. doi:10.1016/j.procs.2015.05.141.

AutoGrid, https://www.auto-grid.com, 2020.

EnergyHub, https://www.energyhub.com, 2020.

Stem, https://www.stem.com, 2020.

EnelX, https://www.enelx.com, 2020.

A. Al-Fuqaha, M. Guizani, M. Mohammadi, M. Aledhari, M. Ayyash, Internet of things: A survey on enabling technologies, protocols, and applications, IEEE Communications Surveys Tutorials 17 (2015) 2347-2376. doi:10.1109/COMST.2015.2444095.

R. Agarwal, D. G. Fernandez, T. Elsaleh, A. Gyrard, J. Lanza, L. Sanchez, N. Georgantas, V. Issarny, Unified IoT ontology to enable interoperability and federation of testbeds, in: 2016 IEEE 3rd World Forum on Internet of Things (WF-IoT), 2016, pp. 70-75. doi:10.1109/WF-IoT.2016.7845470.

C. Adjih, E. Baccelli, E. Fleury, G. Harter, N. Mitton, T. Noel, R. Pissard-Gibollet, F. Saint- Marcel, G. Schreiner, J. Vandaele, T. Watteyne, Fit IoT-Lab: A large scale open experimental iot testbed, in: 2015 IEEE 2nd World Forum on Internet of Things (WF-IoT), 2015, pp. 459-464. doi:10.1109/ WF-IoT.2015.7389098.

D. J. Cook, A. S. Crandall, B. L. Thomas, N. C. Krishnan, Casas: A smart home in a box, Computer 46 (2013) 62-69. doi:10.1109/MC.2012.328.

T. van Kasteren, A. Noulas, G. Englebienne, B. Krose, Accurate Activity Recognition in a Home Setting, Association for Computing Machinery, New York, NY, USA, 2008, p. 1-9. doi:10.1145/1409635.1409637.

C. Zhu, V. C. M. Leung, L. Shu, E. C. Ngai, Green internet of things for smart world, IEEE Access 3 (2015) 2151-2162. doi:10.1109/ACCESS.2015.2497312.

J. Yang, Y. Han, Y. Wang, B. Jiang, Z. Lv, H. Song, Optimization of real-time traffic network assignment based on iot data using dbn and clustering model in smart city, Future Generation Computer Systems 108 (2020) 976-986. URL: http://www.sciencedirect.com/science/article/pii/S0167739X17310609. doi:https://doi.org/10.1016/j.future.2017.12.012.

A. Radovanovié et al. Powernet for distributed energy resource networks, in: 2016 IEEE Power and Energy Society General Meeting (PESGM), 2016, pp. 1-5.

J. Upton, J. Humphreys, P. Groot Koerkamp, P. French, P. Dillon, I. De Boer, Energy demand on dairy farms in ireland, Journal of Dairy Science 96 (2013) 6489-6498.

J. Hill, Total energy indicators of agricultural sustainability: Dairy farming case study, 2001.

F. Power,Dairy farms, 2017. URL:https://esource.bizenergyadvisor.com/article/dairy-farms.

D. Smith, T. Smith, B. Rude, S. Ward, Short communication: comparison of the effects of heat stress on milk and component yields and somatic cell score in holstein and jersey cows, Journal of Dairy Science 96-5 (2013) 3028-3033.

S. Rafique, M. Humayun, Z. Gul, A. Abbas, H. Javed, Systematic review of web application security vulnerabilities detection methods, Journal of Computer and Communications 03 (2015) 28-40. doi:10.4236/jcc.2015.39004.

N. Smithline, A. Stock, B. Glas, T. Gigler, Owasp top 10—2017: The ten most critical web application security risks, Creative Commons (2017).

(56) References Cited

OTHER PUBLICATIONS

D. Ryan et al. Evaluating two different evaporative cooling management systems for dairy cows in a hot, dry climate, Journal of Dairy Science 75 (1992) 1052-1059.

L. Rong, P. V. Nielsen, B. Bjerg, G. Zhang, Summary of best guidelines and validation of cfd modeling in livestock buildings to ensure prediction quality, Computers and Electronics in Agriculture 121 (2016) 180-190.

T. Norton, J. Grant, R. Fallon, D.-W. Sun, Improving the representation of thermal boundary conditions of livestock during cfd modelling of the indoor environment, Computers and Electronics in Agriculture 73 (2010) 17-36.

K. Gebremedhin, B. Wu, Simulation of sensible and latent heat losses from wet-skin surface and fur layer, Journal of Thermal Biology 27-4 (2002) 291-297. doi:https://doi.org/10.1016/S0306-4565(01)00091-2.

A. Berma, Increasing heat stress relief produced by coupled coat wetting and forced ventilation, Journal of dairy science 91 (2008) 4571-4578.

Z. Khan et al. A comprehensive mathematical model for simulation of latent and sensible heat losses from wet-skin surface and fur layer of a cow, Journal of King Abdulaziz University, Islamic Economics 7-1 (2006) 83-96.

K. Anderson, R. Rajagopal, A. El Gamal, Coordination of distributed storage under temporal and spatial data asymmetry, IEEE Trans. on Smart Grid PP (2017).

Solar power data for integration studies, National Renewable Energy Lab. Available: https://www.nrel.gov/grid/solar-power-data.html (2020).

C. P. U. Commission, Rule 21 interconnection, 2020. URL: https://www.cpuc.ca.gov/Rule21/.

S. Dikmen, P. Hansen, Is the temperature-humidity index the best indicator of heat stressin lactating dairy cows in a subtropical environment?, Journal of Dairy Science 92 (2009) 109-116. doi:doi:10.3168/jds.2008-1370.

U.S.: top dairy states by number of milk cows 2020-2022 located at https://www.statista.com/statistics/194962/top-10-us-states-by-number-of-milk-cows/.

Designing air flow systems: A theoretical and practical guide to the basics of designing air flow systems. 2003. URL:https://www.captiveaire.com/manuals/airsystemdesign/designairsystems.html.

Packetized, https://www.packetizedenergy.com, 2020.

* cited by examiner

BEHIND-THE-METER RESOURCE MANAGEMENT SYSTEM

CROSS-REFERENCE TO RELATED APPLICATIONS

The present application claims priority to U.S. Provisional Patent Application No. 63/165,378 to Rajagopal, filed Mar. 24, 2021, and entitled "Powernet: Behind-The-Meter Resource Management In A Dairy Farm", and incorporates its disclosure herein by reference in its entirety.

STATEMENT OF GOVERNMENT SUPPORT

This invention was made with government support under DE-AR0000697 awarded by the Department of Energy. The government has certain rights in the invention.

BACKGROUND

Coordinating behind-the-meter (BTM) distributed energy resources (DERs) is important to ensure efficiency and reliability for consumers facing an increasingly variable grid supply. Such coordination of heterogeneous resources at scale, outside of controlled environments, has remained a challenge due to limitations in sensing, communications and modeling in field settings.

SUMMARY

In some implementations, the current subject matter relates to a computer implemented method for managing power resources. The method may include processing, using at least one processor, one or more measurements received from one or more sensors communicatively coupled to the processor, the sensors monitoring and measuring at least one of: one or more operational parameters associated with operation of at least one equipment, one or more external parameters associated with an environment of the equipment, and one or more power parameters associated with a power consumption by the equipment. The method may further include determining, based the processed measurements, one or more future operational parameters associated with an operation of the equipment, and controlling operation of the equipment using the determined future operational parameters.

In some implementations, the current subject matter may include one or more of the following optional features. The operational parameters may include at least one of the following: an operating speed of the equipment, a duration of the operation of the equipment, a start time of the operation of the equipment, an end time of the operation of the equipment, and any combination thereof.

In some implementations, the external parameters may include at least one of the following: an external temperature corresponding a temperature of air outside of an operational location (e.g., barn) of the equipment, an internal temperature corresponding a temperature of air at the operational location of the equipment, an external humidity corresponding a humidity of air outside of the operational location of the equipment, an internal humidity corresponding a humidity of air at the operational location of the equipment, a wind speed of air outside of the operational location of the equipment, a wind direction of air outside of the operational location of the equipment, a level of solar irradiance outside of the operational location of the equipment, and any combination thereof.

In some implementations, the power parameters may include at least one of the following: a power consumption by the equipment during operation from an electrical grid, a power consumption by the equipment during operation from a stored power source, a power consumption by the equipment during operation from an alternate energy source, and any combination thereof.

In some implementations, the determining operation may include training at least one model using at least one of: one or more operational parameters associated with operation of at least one control equipment, one or more external parameters associated with an environment of the control equipment, and one or more power parameters associated with a power consumption by the control equipment, and any combination thereof, predicting, using the trained model, the future operational parameters associated operation of the equipment based on the processed one or more measurements.

In some implementations, the operational parameters associated with the operation of at least one control equipment may be maximum one or more operational parameters. The external parameters associated with the environment of the control equipment may be maximum one or more external parameters. The power parameters associated with the power consumption by the control equipment may be maximum one or more power parameters.

In some implementations, the determining operation may include determining the future operational parameters associated with the operation of the equipment to reduce a power consumption by the equipment from an electrical grid during operation.

In some implementations, the controlling operation may include providing a control signal to one or more variable frequency drive components to control operation of the equipment based on the determined future operational parameters. The or more variable frequency drive components may be communicatively coupled to and selectively provide power to the equipment from at least one of the following: an electrical grid, a stored power source, an alternate energy source, and any combination thereof. Further, the equipment may be a fan installed in a farming facility configured to house cattle. The alternate energy source may include at least one of the following: a solar panel, a windmill, a hydroelectric station, and any combination thereof.

In some implementations, the current subject matter relates to a system for managing power resources. The system may include at least one equipment configured to consume power to operate, the power being provided to the at least one equipment from at least one power source, the power source including at least one of: an electrical grid, a stored power source, an alternate energy source, and any combination thereof. The system may also include one or more variable frequency drive components configured to be communicatively coupled to the at least one equipment and configured to control operation of the at least one equipment based on one or more future operational parameters. One or more sensors may be configured to be communicatively coupled to at least one of: the at least one equipment and the one or more variable frequency drive components, and configured to monitor and measure at least one of: one or more operational parameters associated with operation of at least one equipment, one or more external parameters associated with an environment of the at least one equipment, and one or more power parameters associated with a power consumption by the at least one equipment. A cloud-based management system may be configured to process one or more measurements received from the one or more sensors, and determine, based the processed one or more measurements, using at least one model, the one or more future operational parameters associated with the operation of the at least one equipment. The cloud-based management system may transmit the determined one or more future operational parameters to the one or more variable frequency drive components. The variable frequency drive components, using the transmitted one or more future operational parameters, may be configured to control operation of the at least one equipment by selectively providing power to the at least one equipment from the at least one power source.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
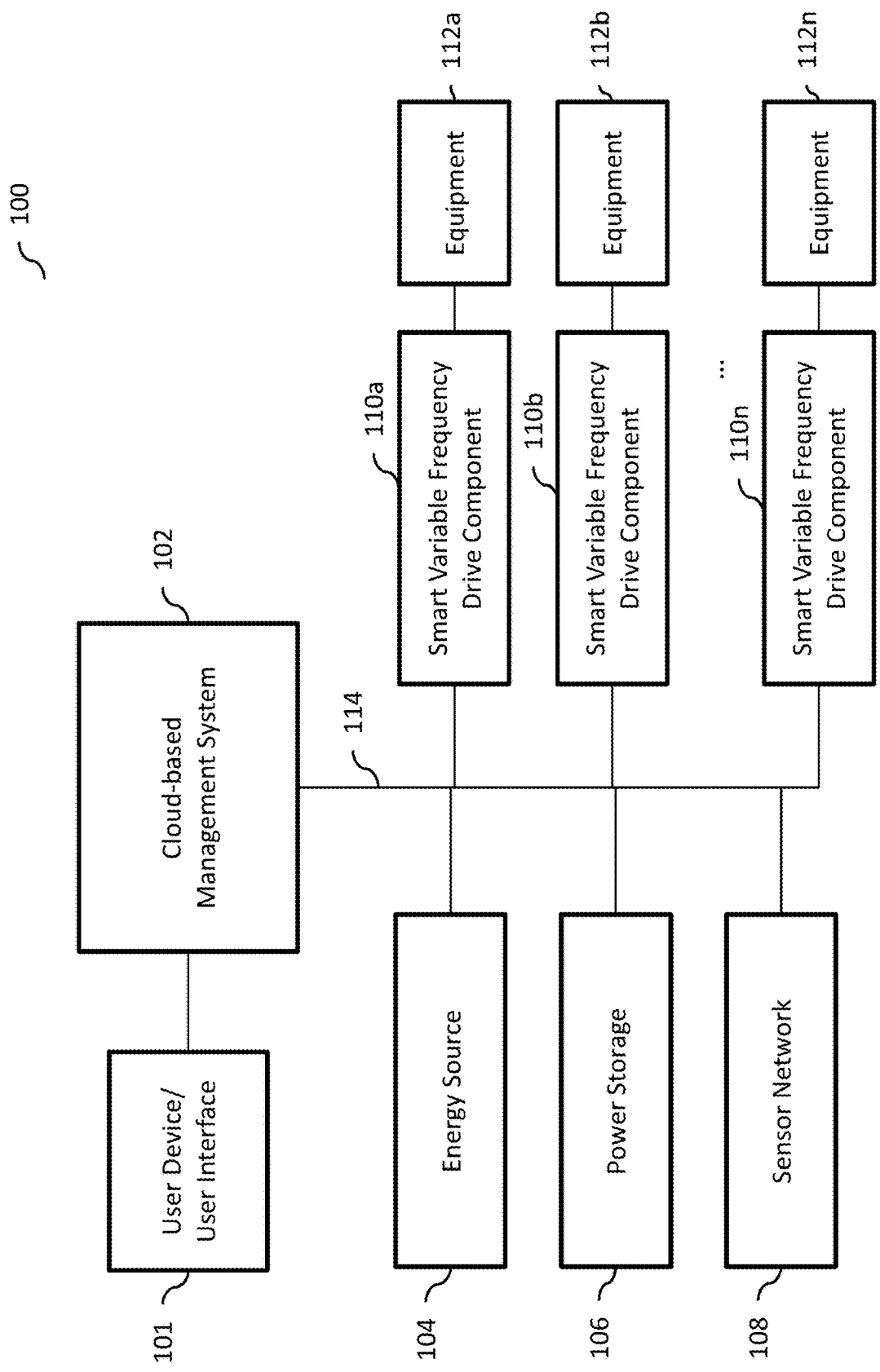
FIG. 1 illustrates an exemplary power resource management system, according to some implementations, of the current subject matter.

In some implementations, the current subject matter provides for a cloud-based BTM system that is capable of data-driven management and coordination of battery storage, rooftop solar PV, and motor loads. Unlike existing BTM systems, the farm environment presents unique challenges. The system manages resources by forecasting loads and solar based on data from a weather sensor network and utilizing a model predictive control to minimize electricity costs while accounting for livestock well-being specific constraints. An experimental implementations of the current subject matter's BTM system demonstrated that it is able to reduce costs between 40.75% to 92.20% depending on available capabilities and decreases reliance on grid energy by up to 92.68%. The current subject matter's system and architecture enables the management of other types of agricultural and industrial BTM resources at scale.

The increasing demand for electricity coupled with concerns about the environment and decreasing costs of technology have been driving an ever faster adoption of behind the meter (BTM) resources, such as distributed solar generation, electric vehicles, battery storage systems and digitally controlled loads. The widespread adoption of Internet of Things (IoT) and cloud computing technologies can enable the design of modern BTM resource management systems to monitor, manage and coordinate these resources cost effectively, providing benefits to consumers, utilities and the grid in general. These systems have the potential to reduce electricity costs, support the integration of large amounts of centralized and distributed renewables and increase the efficiency of storage use while accounting for consumer preferences and device operational constraints. Designing BTM resource management systems that can be deployed at scale, however, has remained a critical challenge.

There has been a large body of recent work on BTM resource management. Most of this work has focused on the residential and commercial sectors. Popular control strategies include optimization based methods and more recently reinforcement learning based methods. Despite demonstrating promise in simulations, these approaches have not been validated in field experiments, which are critical to determining if a BTM management system design is appropriate for practical deployment at scale. Field deployment and testing face significant challenges beyond those encountered in simulations and lab prototyping, including the design and integration of sensor networks, dealing with real device operating constraints and performance, and operational challenges such as environment conditions, site specific constraints (electrical, communication, space), service reliability, ongoing support, and costs of deployment and maintenance.

Several companies provide BTM management solutions, primarily for electric utility centered residential and commercial applications. They are largely focused on homogeneous load types (e.g., water heaters, smart thermostats) in controlled environments with demand response or demand charge reduction as a sole goal. These systems are not aimed to coordinate load, storage and distributed generation for goals that include decarbonization and cost management. Moreover, there is very limited integration of IoT sensor technologies to enable coordination in such systems. IoT applications have focused on monitoring and data science in residential or commercial environments rather than coordination.

In some exemplary, non-limiting implementations, the current subject matter's BTM management system may be implemented in an agriculture application environment. Such applications face many unique challenges beyond those encountered in controlled environments such as residential or commercial, including variable and extreme weather conditions, distinct load profiles, large physical distances between resources, and lack of existing sensing and communications infrastructure. Dairy, poultry, and pork farms have large numbers of electric motors that consume significant amounts of power, generate high inrush currents during start-up because they often operate simultaneously. These characteristics can have a substantial impact on system stability such as voltage sags and circuit breaker trips, and electricity costs both in terms of energy and demand charges, which comprise a significant fraction of the total farm operating cost. Agricultural motor loads also offer a unique opportunity for coordination, by controlling how they operate in response to real time information from the environment. A BTM resource management system in such a setting must account for energy and demand charges, application specific constraints (e.g., integrating 3-phase motors with special driving equipment), and animal well-being. The BTM system also requires the integration of sensors to measure a diverse set of variables such as climate conditions and power that drive operating constraints. Modeling and forecasting of such variables presents additional challenges for designing and deploying an agricultural BTM resource management system. The unique and demanding environment in agriculture can provide valuable insights into how to develop scalable BTM resource management systems for similar applications.

FIG. 1 illustrates an exemplary power resource management system 100, according to some implementations, of the current subject matter. The system 100 may include a user device 101, a management system component 102, an energy source component 104, a power storage component 106, a sensor network 108 that may include one or more sensors, and one or more smart variable frequency drive components 110 (a, b, . . . , n) that may be coupled to one or more equipment components (e.g., ventilation fans) 112 (a, b, . . . , n). The components 101-112 may be communicatively coupled to one another using one or more communication links, power connections, application programming interfaces, and/or any other types of interfaces 114. In some exemplary implementations, a component may refer to a hardware and/or a piece of software code that may be configured to perform a particular function, a piece and/or a set of data, and/or configuration data used to create, modify, etc. one or more software functionalities. Further, the system 100 may include one or more artificial intelligence and/or learning capabilities that may rely on and/or use various data, e.g., data related to and/or monitoring/controlling operation of one or more equipment(s) 112.

The user device 101 may include one or more user interfaces that may be used to display various information associated with operation of the system 100 (e.g., power consumed, power stored, operational status (e.g., on/off, malfunctioning, timed operation, etc.) of various components of the system 100. The user interface may also be used to issue various commands to one or more components of the system 100, generate queries, and/or perform any other tasks. In some exemplary implementations, the user interface 101 may be a web portal that may provide any of the above functionalities.

The management system component 102 may be configured to monitor and/or control operation of the system 100. The component 102 may be configured to be cloud-based, network-based, locally installed, and/or disposed in any other way. The component 102 may be configured to autonomously monitor and/or control operation of each individual component of the system 100 and/or any combination of components of the system 100. Moreover, the component 102 may be configured to include one or more machine learning capabilities to analyze data received as a result of operation of the system 100 and adjust operation of one or more components of the system 100 based on such analysis (e.g., change operation of one or more equipment 112 in relation to amount of power stored in the power storage component 106, etc.).

The energy source 104 may be configured to include one or more components capable of receiving and processing power (e.g., electrical power). Such energy source 104 components may include one or more solar panels, solar power plants, windmills, wind power plants, hydroelectric power plants, one or more electrical grid(s) (e.g., provided by a utility company), and/or any other sources of energy. The energy source 104 may be configured to provide electrical (and/or any other energy) for operation of one or more smart variable frequency components 110 and/or equipment 112 as well as one or more sensors in the sensor network 108. Further, the energy source 104 may also provide received energy for storage in the power storage component 106. The power storage component 106 may include a battery, a capacitance bank, a supercapacitor, a superconducting magnetic energy storage, and/or any other types of energy storage components.

The sensor network 108 may include one or more sensors, which may include wired sensors, wireless sensors, Internet-of-Things (IoT) sensors, and/or any other types of sensors. The sensors may be configured to detect, monitor, measure, etc. and provide information related to various conditions, such as, for example, air temperature (interior, exterior, etc.), wind speed, wind direction, humidity, luminosity (e.g., how much light is present at a particular location), weather forecast, time, and/or operational temperature, operational status, etc. of one or more components of the system 100, and/or any other conditions, and/or any combinations thereof.

The smart variable frequency drive component(s) 110 may be configured to control operation of the equipment(s) 112. For example, if equipment 112 is a fan, the component 110 may be configured to control turning on/off of the fan at predetermined times and/or upon receiving appropriate signals from one or more other components of the system 100).

The elements of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The elements of the system 100 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

In some exemplary, non-limiting, implementations, the system 100 may be implemented in a farm setting, such as, in a facility (e.g., a barn) that is designed to house cattle (e.g., cows), where the system 100 may provide smart ventilation control of the interior of the facility. The exemplary, non-limiting system 100 setting may include a rooftop solar system (e.g., similar to energy source 104), a battery storage (e.g., similar to a power storage 106), a smart variable frequency drive(s) (SVFD) 110 coupled to each individual ventilation fan (e.g., equipment(s) 112), and an IoT wireless sensor network (e.g., similar to sensor network 108). The system 100 may be monitored and controlled by the cloud-based management system 102, which may provide a user interface 101 (e.g., a farmer-centric) with a real-time information of the system's operation through a web-portal from any device connected to the Internet.

In the above setting, the system 100 may include at least one of the following features and/or advantages: (1) an active real-time control of the fans 112, solar systems 104, and/or energy storage system 106 that may leverage their flexibility, (2) real-time visibility, with spatial and/or temporal resolution, of system variables via the sensor network 108, (3) incorporation of external signals such as price, grid events, and/or local weather information in the controller design, (4) minimization of electricity cost via the cloud-based control and coordination system 102 which may provide flexibility and/or customization for a particular set of constraints, (5) a secure and scalable platform that may interface with multiple off-the-shelf custom hardware solutions, (6) the user interface 101 that may convert field data (e.g., data obtained during operation of the system 100) into user-specific information about system operations, and/or any other features/advantages.

Figure 2:
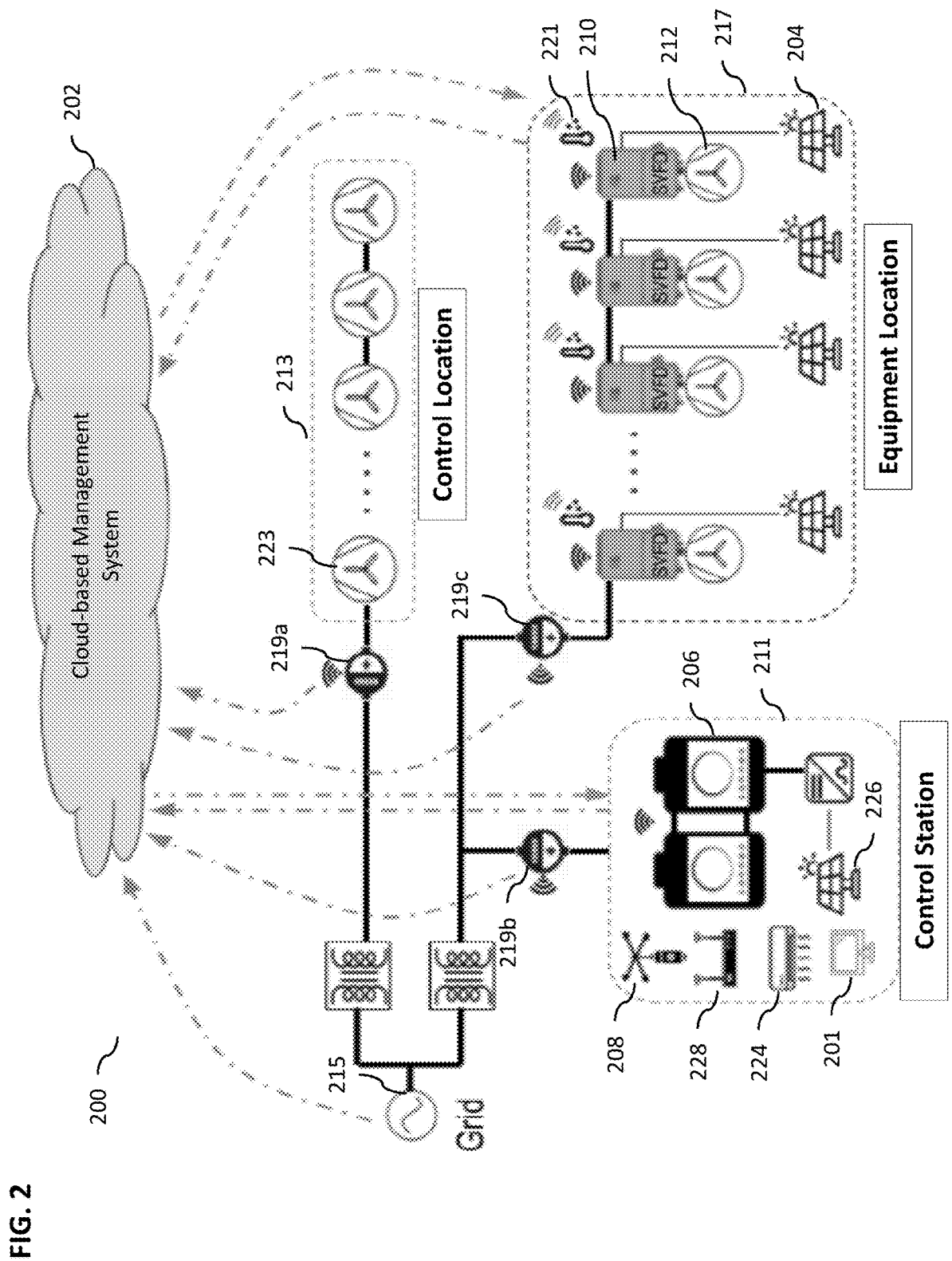
FIG. 2 illustrates an exemplary system for managing power consumption, according to some implementations of the current subject matter.

FIG. 2 illustrates an exemplary system 200 for managing power consumption (e.g., in a farm setting and/or any other setting), according to some implementations of the current subject matter. The system 200 may be similar to the system 100 shown in FIG. 1. The system 200 may include a cloud-based management system 202, an operation control location 211, a control equipment location 213, and an equipment location 217. The system 200 may be coupled to an external electrical grid system 215 that may supply the system 200 with electrical power to operate one or more of its components.

The system 200 may also include one or more electrical meter components 219 (a, b, c) that may be associated/positioned at various locations, e.g., electrical meter component 219a may be associated with the control location 213, electrical meter component 219b may be associated with the control station 211, and electrical meter component 219c may be associated with the equipment location 217. The electrical meter components 219 may be configured to detect and/or measure consumption of electricity by the respective components and transmit it (e.g., wirelessly and/or via wired connections) to one or more other components of the system 200 (e.g., the cloud-based management system 202).

The control location 213 may include one or more fans 223 that may be configured to operate at a maximum speed and thus, maximum power consumption, and may be used for comparison and/or modeling purposes to control operation of the equipment location 217. The equipment location 217 may include one or more SVFD components 210 coupled to one or more fans 212. Each SVFD component 210 may also be coupled to a respective solar panel component 204 (and/or any other source of power) as well as the electrical grid 215. Further, each SVFD component 210 may be associated with one or more wireless (and/or wired) sensors 221 that may be configured to detect/monitor operation of the SVFD 210 and/or fan 212 and transmit the data to one or more other components of the system 200 (e.g., the cloud-based management system 202).

As can be understood, one or more of the above components may be deployed at any location on the farm, and specifically, inside and/or outside of a barn that may be housing cattle. The barn may be an open air barn that may allow entry of air from exterior of the barn. The external electrical grid 215 may provide electrical power that may be used for operation of one or more components of the system 200. In particular, the control location 213 may be positioned in a top circuit branch 220 of the grid 215, and the equipment location 217 and control station 211 may be disposed proximate the barn in a bottom circuit branch 222 of the grid 215.

In some exemplary implementations, the control station 211 may house battery storage systems 206 (e.g., as shown in FIG. 2, for example, two 16 kWh battery systems), an air-conditioning system, a rooftop solar system 226 (e.g., as shown in FIG. 2, for example, 1.5 kW solar system), a network equipment 228, one or more sensors 208, and a user interface device 201. Multiple sensors 208 (e.g., similar to sensors 108) may be installed in the barn to provide real-time information to the cloud-based management system 202. A wireless metering system (e.g., meter 219a and meter 219c, respectively) may be installed in a main electrical service panel of the barn in which the control location 213 and equipment location 217 electrical circuits are located to monitor voltage, current, and real and reactive powers. The meters 219a and 219b may be configured to monitor, measure and/or detect at least one of the following: a total control location 213 load, a control station 211 load, a fan-only load in the equipment location 217, and an equipment location 217 load, including control station 211 and fans.

In some exemplary implementations, a self-powered wireless network of temperature and/or relative humidity (TH) sensors 221 may be installed in the equipment location 217 (e.g., one per fan 212 as shown in FIG. 2) to provide spatial and/or temporal measurements. For instance, the sensors 221 may be positioned at a predetermined distance (e.g., 2 meters) above the ground inside the barn to prevent animal interference. To measure outdoor conditions, a TH sensor and/or a wind speed sensor may be installed outside the barn. The wind speed sensor may allow selective imposing of a hard constraint on fan operation. For example, if external wind speed exceeds 10 meters per second (m/s), all fans may be turned off independent of the internal barn temperature, since at this speed fans are not needed to provide the needed ventilation.

Each of the fans 212 (e.g., there may be 15 fans and/or any other desired number of fans) in the equipment location 217 may be controlled by a respective single SVFD component 210 connected to the electric grid 215 and also coupled to one or more solar panels 204 (e.g., there may be 5 solar panels and/or any other desired number of panels). In some exemplary implementations, the panels may provide a total nominal power output of 1.625 kW. The SVFD component(s) 210 may act as a maximum power point tracker (MPPT), using the power generated by the solar panels 204 to operate the fan load and using grid power 215 when solar power is not sufficient for operation. Each of the SVFD components 210 may also include an application programming interface (API) that may enable one or more external applications to control it.

Figure 3:
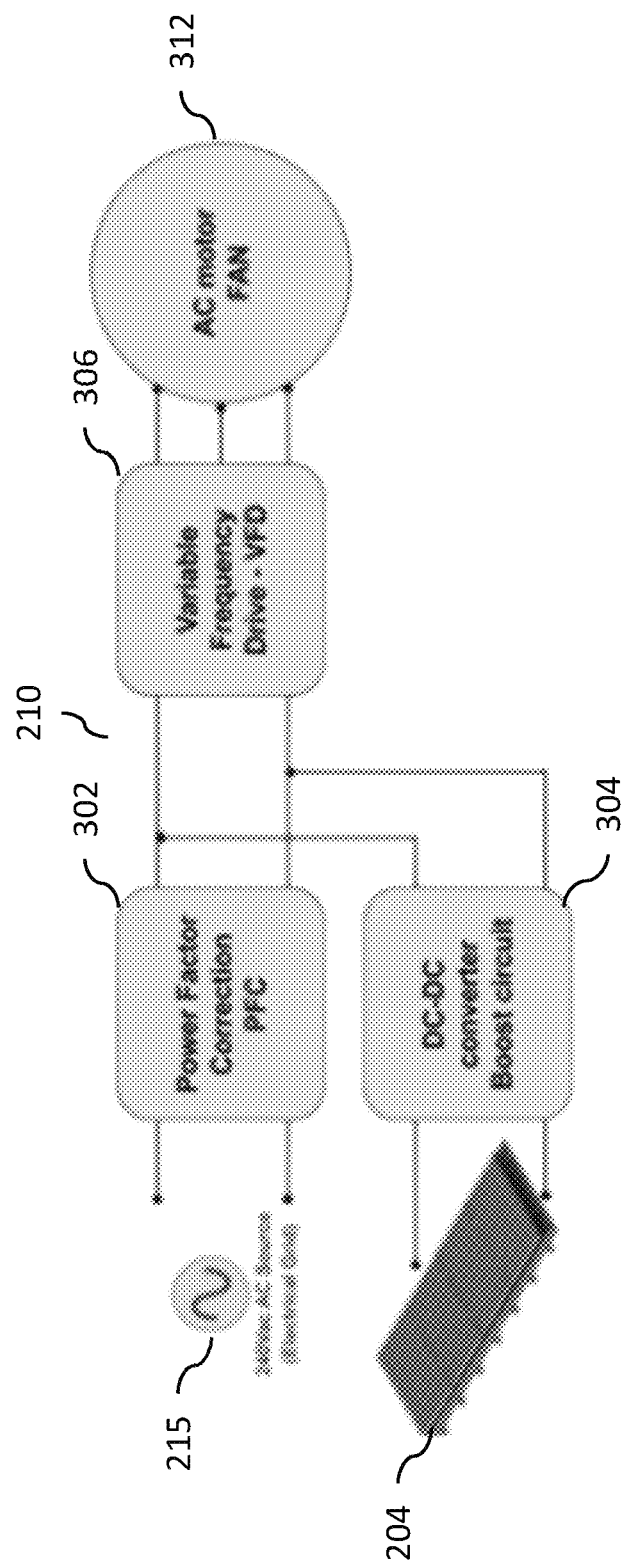
FIG. 3 illustrates an exemplary smart variable frequency drive component, according to some implementations of the current subject matter.

FIG. 3 illustrates an exemplary SVFD component 210, according to some implementations of the current subject matter. As shown in FIGS. 2 and 3, the component 210 may be coupled to the electrical grid 215 and one or more solar panels 204 as well as to an AC motor fan 312 (which may be part of the fan 212). The SVFD component 210 may include a power factor correction (PFC) component 302, a DC-DC converter boost circuit component 304, and a variable frequency drive (VFD).

The SVFD component 210 may be a variable frequency drive equipment that may, for example, operate in a three-phase 240 V electrical system. It may act as a power converter that may have two inputs: a DC power from one or more solar panels 204 and AC power from the electrical grid 215. It may further act as a solar MPPT with a DC-DC boost converter 304 stage to harvest the power generated by the solar panel(s) 204 to supply the load. It may also have the power factor correction 302 stage to boost an inductive power factor (e.g., 0.6 factor) from the fan 212 to approximately 1 and the variable frequency drive 306 that may be configured to change fan motor's 312 operating speed. In some implementations, the SVFD component 210 may provide soft-start capabilities to reduce inrush current during startup. Further, it may prioritize the power generated by solar panels 204 to drive the load, and if additional power is required to run the fan motor 312, SVFD component 210 may be supplemented by the power from grid 215. Additionally, the SVFD component 210 may be configured to include an enclosure or housing that enables it to sustain harsh outdoor environmental conditions.

Referring back to FIG. 2, in some exemplary implementations, the fan circuit in the equipment location 217 may be energized only if the temperature inside the barn rises above a predetermined temperature threshold (e.g., which may be predetermined using a thermostat sensor). When energized, fans 212 may be individually controlled using the respective SVFD component 210 based on measurements from the TH and/or wind speed sensor network 208. This may allow to staggering start times of each individual fan 212, reducing fans inrush current and/or customizing the fan(s) control to local measurements (e.g., temperature, humidity, wind speed, direction, etc.).

In some exemplary implementations, the battery storage system 206 may include one or more (e.g., two) power unites (e.g., 16 kWh/8 kW units as available from Sonnen GmbH, Germany). The battery capacity may be determined to offset a predetermined period of time (e.g., at least one hour) of continuous fan operation at a maximum speed, such as, after a sunset when solar power generation might not be available, to help reduce demand charges, where solar power generation may primarily be used to offset consumption of electricity from the grid 215 during the day.

As shown in FIG. 2, all components of the system 200 may be communicatively coupled to the cloud-based management system 202. The communicative coupling may be via one or more wireless communication networks, wired communication networks, and/or any other type of network. The communicative coupling of the components of the system 200 may be performed using one or more APIs that may allow third party application integration.

Figure 4:
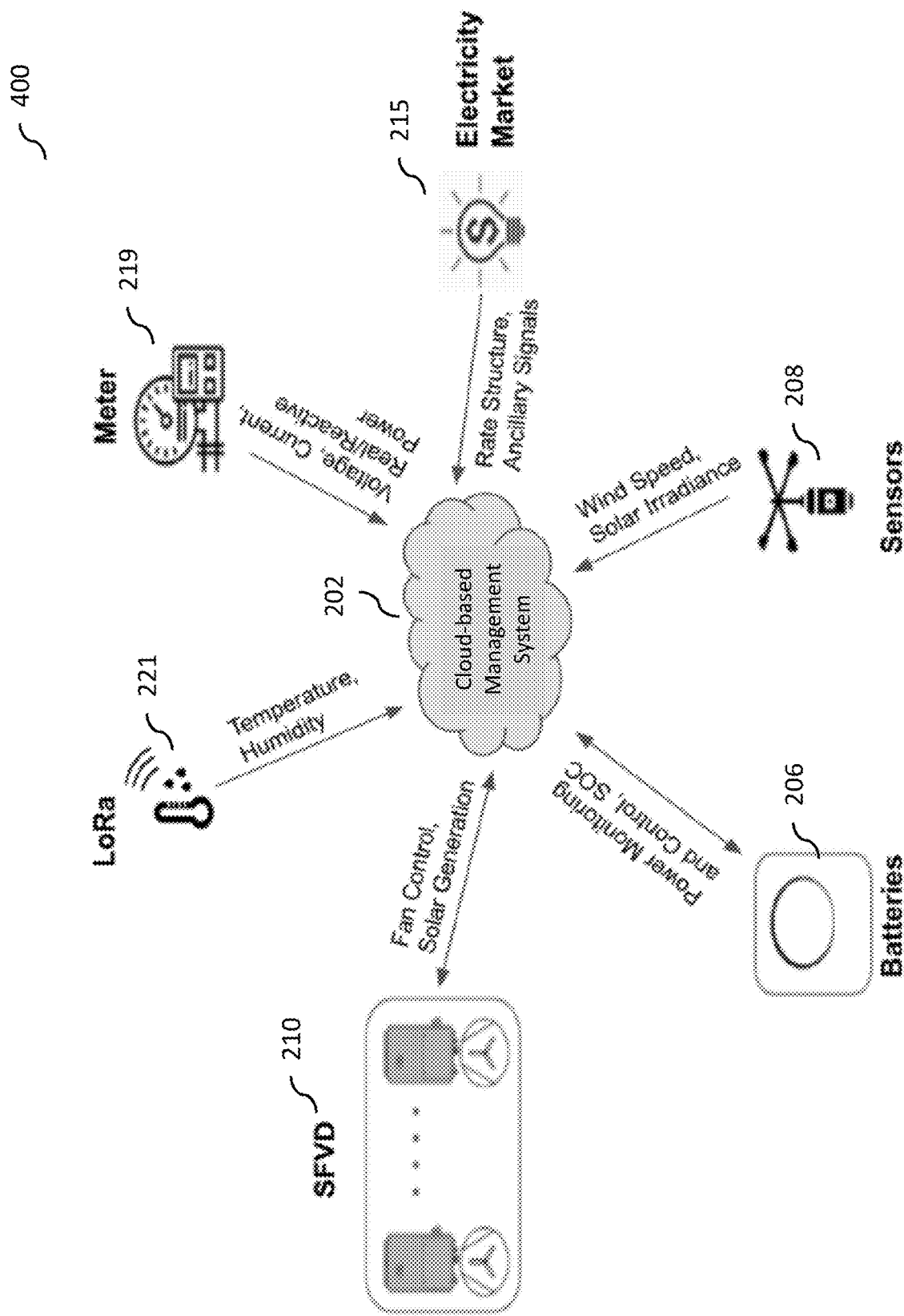
FIG. 4 illustrates an exemplary communication architecture that may be implemented in the system shown in FIG. 2, according to some implementations of the current subject matter.

FIG. 4 illustrates an exemplary communication architecture 400 that may be implemented in the system 200, according to some implementations of the current subject matter. The architecture 400 may provide communication capabilities between the cloud-based management system 202 and one or more SVFD component(s) 210, sensor(s) 221, power meters 219 (a, b, c), electrical grid 215, sensor(s) 208, and battery system(s) 206. For example, the cloud-based management system 202 may receive data related to temperature and/or humidity measurements from one or more sensor(s) 221 that may be installed in the equipment location 217 in the barn. The sensor(s) 221 may be using a long range (LoRa) wireless protocol and/or any other communication protocol to transmit data to the cloud-based management system 202.

The power meters 219 may be configured to monitor and measure related to voltage, current, real/reactive power, and/or other data related to electrical consumption by one or more components of the system 200 shown in FIG. 2 (e.g., fans 212). Such data may then be transmitted to the cloud-based management system 202 for processing.

The sensor(s) 208 may be so positioned (e.g., outside of the barn) as to detect and measure various weather, solar, etc. related data. For example, the sensor(s) 208 may measure wind speed, wind direction, external temperature, external air humidity, solar irradiance, luminosity, etc. and transmit the measured data to the cloud-based management system 202 for processing together with other data.

The cloud-based management system 202 and the power storage system 206 may exchange various data related to power control and monitoring. For example, the system 206 may provide information as to the remaining capacity of the battery system 206 and/or amount of power that may be available for running one or more fans 212.

The cloud-based management system 202 and the SVFD component(s) 210 may also exchange data related to fan control, solar generation, power, etc. For example, the cloud-based management system 202 may be configured to transmit signals to the SVFD component(s) 210 to cause these components to operate one or more fan(s) at predetermined time, for a predetermined period of time, etc. One or more fans 212 may be operated simultaneously, in a staggered fashion, in groups, etc. as well as, may start at the same or different times, etc. Such control signals may be generated based on the data the cloud-based management system 202 receives from the remaining components shown in FIG. 4 as well as feedback data received from the SVFD component(s) 210.

Figure 5:
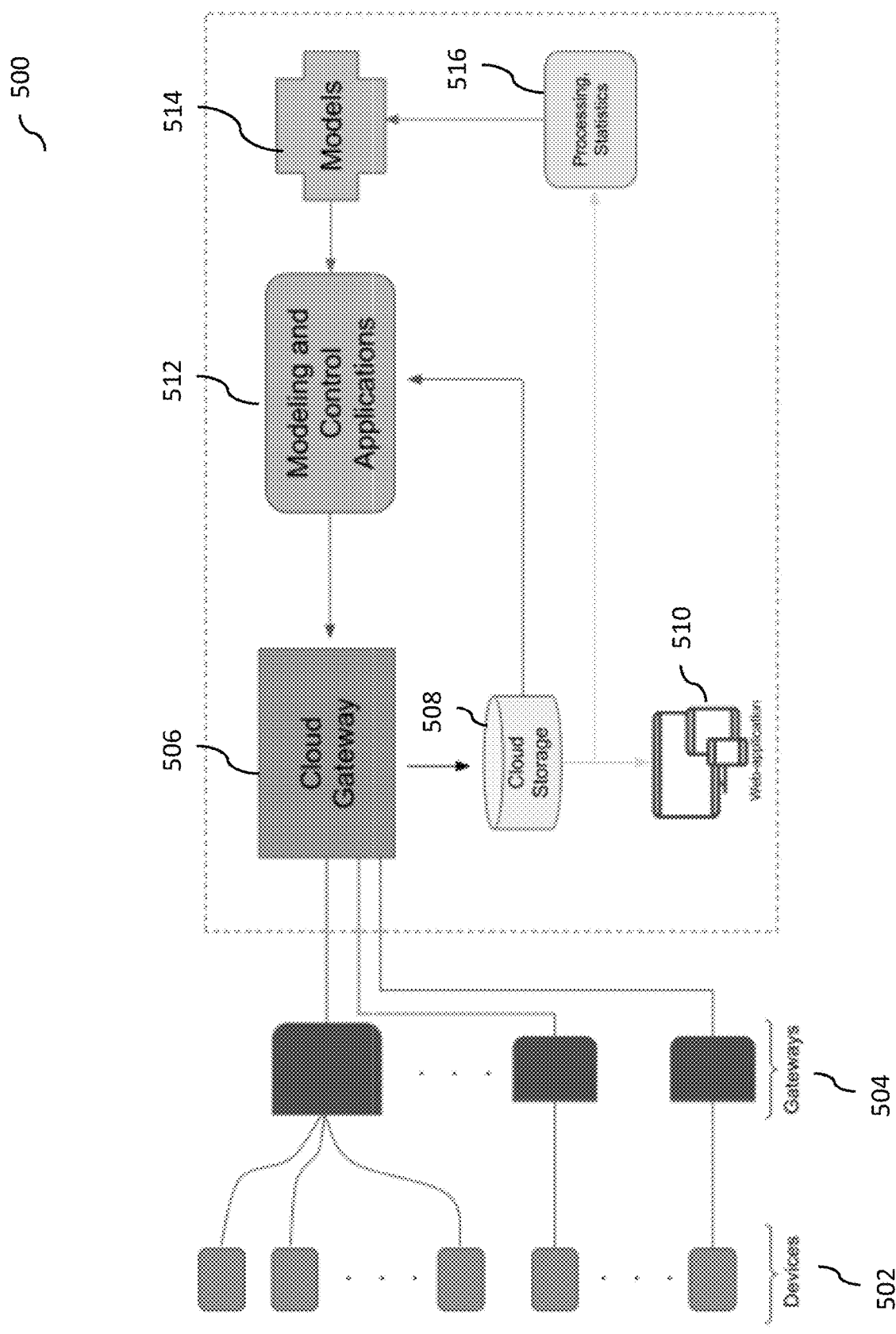
FIG. 5 illustrates an exemplary cloud-based management system, according to some implementations of the current subject matter.

FIG. 5 illustrates an exemplary cloud-based management system 500, according to some implementations of the current subject matter. One or more components of the system 500 may be similar to one or more components of the cloud-based management system 202 shown in FIG. 2. The system 500 may include one or more devices 502, one or more gateways 504, a cloud gateway 506, a cloud storage 508, one or more web applications 510, one or more modeling and control applications 512, one or more model components 514, and one or more processing and/or statistical components 516.

In some implementations, the devices 502 may correspond to loads associated with one or more components of the system 200 shown in FIG. 2, sensors (e.g., sensors 208, 221), distributed energy resources (DERs) (e.g., solar panel systems 204, 226, energy storage systems 206). Gateways 504 may be configured to provide connectivity between devices 204 and the cloud. The cloud gateway 506 may be configured to provide communication between the gateways 504 and the cloud-based management system using a communication protocol (e.g., hypertext transfer protocol (HTTP)). The cloud gateway 506 may also be configured to provide one or more APIs and/or ensure compatibility with one or more APIs to allow for transfer of input data to the cloud storage 508.

The cloud storage 508 may, for example, be a relational database, that may store real-time raw data obtained from one or more components of the system 200 (shown in FIG. 2) to ensure that no data is lost and/or corrupted. The cloud storage 508 may be communicatively coupled to the modeling and control applications 512 and processing/statistical component(s) 516. In some implementations, data stored in the cloud storage 508 may be encrypted.

The processing/statistical component(s) 516 may be configured to generate statistics and/or may perform post-processing of data to extract features such as statistical means and/or variances, auto-regressive coefficients, etc. that may be used to execute forecasting (e.g., when to turn on/off a particular fan, for how long, based on various data (e.g., temperature in the barn, exterior temperature, wind speed, wind direction, humidity, solar power data, time of day, etc.)). Modeling and control application component(s) 512 may be configured to execute one or more modeling and control processes (e.g., using one or more models 514 that may be generated based on the data available from the processing and/or statistical components 516) to determine how to control operation of one or more components of the system 200 shown in FIG. 2 (e.g., fans 212, SVFD components 210, etc.).

Figure 6:
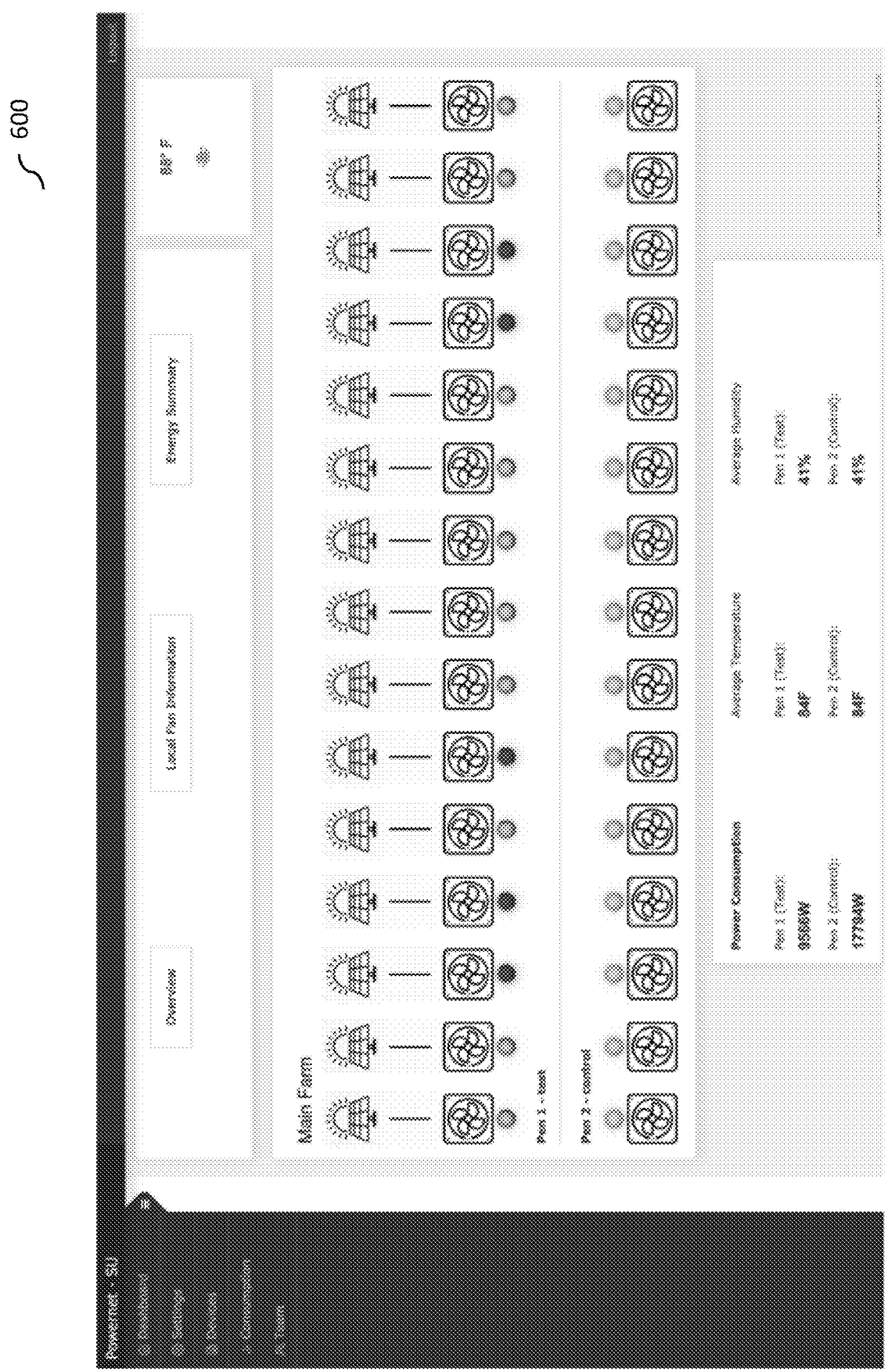
FIG. 6 illustrates an exemplary user interface, according to some implementations of the current subject matter.

The web application component 510 may be configured to enable one or more users to generate an account and interact with the system 500 through a user interface (e.g., user interface 201 shown in FIG. 2). The component 510 may include a role-based authentication framework that may provide different levels of access to different users. For example, a farmer may observe real-time system operation, including the ON/OFF states of fans, control station 211 information, battery state of charge, temperature and humidity profiles, etc. FIG. 6 illustrates an exemplary user interface 600 that may be generated for that purpose, according to some implementations of the current subject matter.

Cloud-based solutions that operate critical systems in real-time may need to be reliable, have high availability, and be secure. Reliability may be defined as the probability that a system is operational within a specified time interval and has no failures, while availability is the probability that a system is functional at a given time. Reliability and availability may intimately be related in such applications and various techniques that benefit both are utilized. The current subject matter system may leverage load balancing, which may ensure that no single server (e.g., and/or any other computing component) of the cloud-based management system 200 is overloaded. The current subject matter may be configured to use auto-scaling, which may operate together with the load balancer to automatically scale up any new servers in the system 200 to accommodate any surge in traffic and/or computing demands. Auto-scaling may be set as a percentage of throughput and central processing unit (CPU) usage. Further, a continuous integration and deployment pipeline may be used to generate an automated way to build, test, package, and deploy applications whenever any code change is made. The cloud-based management system's 200 web application may also include various security features to prevent attacks, viruses, malware, etc. that may disrupt operation of the system 200.

In some implementations, the system 200 may be configured to execute one or more model predictive control (MPC) processes (e.g., data-driven) related to modeling fan operation and coordinating fan operation, solar generation, and battery storage to minimize electricity cost based on a particular rate structure, while accounting for various barn operating constraints. These models and controls may be used in a digital twin simulator of the physical system that may be calibrated with field data. The digital twin may allow testing different control strategies and assess system performance before field deployment and to simulate various scenarios. Table 1 includes definitions of variables used in such processes.

TABLE 1

Variables and constants used in the MPC.

| | Variable Description |
|---|---|
| t, T, n, $N_f$ | time, time steps in horizon, fan index, number of fans |
| $P_0^{max}$, $P_0^{peak}$, $I_p$ | previous horizon maximum power de-mand, and maximum peak period de-mand, indicator of peak time periods |
| P, s | real power demand, solar power generation |
| $\lambda_e$, $\lambda_d$, $\lambda_p$, $\lambda_b$, $\lambda_w$ | energy cost, demand charge weight, peak demand charge weight, battery operation cost, wind deviation cost |
| c, d, f, Q | battery charge power, discharge power, fan power, available battery capacity |
| $c_{max}$, $d_{max}$, $f_{min}$, $f_{max}$, $Q_{min}$, $Q_{max}$ | maximum charge power, discharge power, minimum and maximum fan power, minimum and maximum battery capacity |
| $\gamma_l$, $\gamma_c$, $\gamma_d$ | battery leakage, charge, and discharge efficiency |
| a, x, β, $a_{min}$ | air speed over cows, outdoors wind speed, air speed model parameters, minimum desired air speed |

In some implementations, the system 200 may be configured to execute analysis of evaporative cooling effectiveness, such as, in a barn setting that houses cattle. One of the common approaches to dissipating cattle heat to mitigate heat induced stress involves evaporative cooling. This approach is particularly effective in hot environments with relatively low humidity, such as, for example, in California, United States. In an exemplary setting, one or more sprinklers may be used to spray water directly on the cattle, which evaporates, converting sensible heat to latent heat, which may then be removed from the animal. Using fans to blow air over the cattle may increase the rate of convective heat transfer and keeps moisture from building up in the air near the animal, which may increase the rate of evaporation.

The effectiveness of evaporative cooling and other heat transfer mechanisms may depend on various environmental conditions such as temperature, relative humidity and air flow rate as well as animal characteristics such as skin thickness, type of fur and color. Barn thermal dynamics, air flow patterns, and cow heat transfer may often be modelled using computational fluid dynamics (CFD) and/or other physics-based heat transfer models. However, it is difficult to learn the parameters of these complex models from data obtained from a deployed system, due to the limited coverage of sensors and the inability to perform calibration experiments on live animals. Additionally, these models cannot be easily integrated into a model predictive control framework.

To address this problem, the current subject matter may be configured to provide a proxy for evaporative cooling effectiveness based on air speed, which may be incorporated into the constraint set of the optimization problem discussed below. Various studies have discussed air speed as an important factor for maintaining effective evaporative cooling, since increasing air speed reduces heat stress by increasing the rate of convective heat transfer and increasing the rate of evaporation of water on the animal. The current subject matter may be configured to use air speed as a proxy, where a controller may be designed to maintain a nominal air speed in the barn based on one or more recommended and/or known values. The air flow model used in the model predictive controller is discussed in more detail below.

In some exemplary, non-limiting, implementations, the system 200 may be configured to incorporate a fan control that may be designed such that one or more fans 212 may turn on when the indoor barn temperature is above a predetermined threshold (e.g., 22° C.). The fan 212 speed may be determined as a function of the outdoor wind speed. Because the majority of the animal heat is dissipated through evaporative cooling, one or more fans 212 may be controlled in order to keep a recommended air speed in a predetermined speed range (e.g., between 1.0 m/s and 2.2 m/s; 1.6 m/s may be selected as a nominal air speed for effective evaporative cooling) at the animal's height.

According to the first Affinity Law for fans, air speed may vary linearly with fan blade rotational speed at a particular distance. Since the barn is an open-air structure, the outdoors wind may contribute to the air speed over the cattle. The air speed of a fan may be determined using a balance of pressure created by the rotation of the fan blades and a pressure caused by air resistance in the system, which is a function of the relative air speed through the system. Since the fans 212 may be suspended in the air with minimal enclosures, it may be assumed that the only obstruction contributing to air resistance is the ambient air surrounding the fans 212. The outdoor wind, which makes up the air surrounding the fans, may hit the barn predominantly from a specific direction (e.g., northwesterly direction) and fans blow air from another similar direction (e.g., westerly direction), the outdoor wind speed may be assumed to be in the same direction as the fans. Thus, the relative air speed through the system may decrease proportionally with outdoors wind speed. In order to maintain equal pressure between the fan blades and the air resistance, the relative air speed may be kept constant. Thus, the system 200 may assume that the total air speed from the fan is the sum of the air speed of the fan at zero outdoor wind speed and the outdoors wind speed.

Upon combining the above theoretical model of the fan air system with an empirical calibration of the fan's power, the system 200 may generate the following linear model relating the air speed over the animals $a_t$ in m/s to the aggregate fan power $f_t$ in kW and outdoor wind speed $x_t$ in m/s, $$a_t = \beta_w \left( \beta_{p0} + \beta_p \sum_n^{N_f} f_t \right) + \beta_x x_t, \quad (1)$$

where $\beta_w$, in m/s/Hz, is the sensitivity of the air speed to fan speed and $\beta_{p0}$ and $\beta_p$ define the linear relationship between fan speed and fan power. Based on one or more experimental measurements, it was determined that $\beta_w = 0.0355$ m/s/Hz. In the operating range of 40-60 Hz, the fan speed may be approximated as a linear function of the aggregate fan power based on empirical measurements with $\beta_{p0} = 25.8$ Hz and $\beta_p = 1.9$ Hz/kW. This relationship appears in Equation (1).

The parameter $\beta_x$, in Equation (1), relates the outdoor wind speed to the air speed over the cattle in the barn. If, for example, the outdoor wind speed is at 10 m/s or above, all fans may be turned off to prevent damage to the fans and because there is already sufficient air speed over the cattle generated by external wind. Thus, if $\beta_x = 0.16$, a linear fit is generated between the points (i.e., 0 m/s outdoors wind speed, 0 m/s air speed) and (i.e., 10 m/s outdoors wind speed, 1.6 m/s air speed), with 1.6 m/s air speed being the nominal value for effective evaporative cooling.

In some implementations, the system 200 may be configured to generate one or more forecasts for operating its various components. For example, scheduling an operation of the battery 206 and fans 212 in the farm may require forecasting one or more variables. Each forecast may be generated for a predetermined period of time (e.g., 24 hours ahead) with a predetermined time resolution (e.g., every 15 minutes). The first value of each variable in the forecast horizon may correspond to the most recently measured data point for that variable. The subsequent values may be predicted in different ways depending on the variable.

For example, the uncontrollable load power $P_t$ and solar power $s_{nt}$ may be forecasted using one or more models that may be trained on a month of historical data. The forecast of the temperature, which may be captured in $a_{min}$, that may correspond to the values from the previous day.

The system 200 may be configured to control solar system 204, battery storage 206, and fans 212 by scheduling the power of each component so as to minimize electricity costs while satisfying the farm's operational constraint of maintaining proper ambient conditions for the cattle. Power from the battery storage 206 may be dispatched to reduce the overall electricity cost both from the energy cost through energy arbitrage and the demand charges by shaving peaks. Solar system 204 may be used to reduce the fan power drawn from the grid 215. Fan speed control may be used to minimize the fans 212 power consumption while maintaining the recommended air speed for evaporative cooling of the cattle.

The system 200 may be operated using the model predictive controller (MPC) by solving the following optimization problem as shown by terms/constraints (2a)-(2k)

$$\text{Minimize:}_{c,d,f,Q,a} \sum_t^T \lambda_{et} \left[ P_t + c_t - d_t + \sum_n^{N_f} [f_{nt} - s_{nt}]_+ \right]_+ \quad (2a)$$

$$+ \lambda_d \max_{t \in T} \left\{ P_t + c_t - d_t + \sum_n^{N_f} [f_{nt} - s_{nt}]_+ - P_0^{max}, 0 \right\} \quad (2b)$$

$$+ \lambda_p \max_{t \in T} \left\{ I_p \left( P_t + c_t - d_t + \sum_n^{N_f} [f_{nt} - s_{nt}]_+ - P_0^{peak} \right), 0 \right\} \quad (2c)$$

$$+ \lambda_b \sum_t \left( c_t + d_t + \sum_n^{N_f} f_t \right) \quad (2d)$$

$$+ \lambda_w \sum_t [a_{min} - a_t]_+^2 \quad (2e)$$

Subject to: $0 \leq c \leq c_{max}$, \quad (2f)

$0 \leq d \leq d_{max}$, \quad (2g)

$f_{min} \leq f \leq f_{max}$, \quad (2h)

-continued $$Q_t = \gamma l Q_{t-1} + \gamma_c C_t - \gamma_d d_t, \quad (2i)$$

$$Q_{min} \leq Q \leq Q_{max}, \quad (2j)$$

$$a_t = \beta_w \left( \beta_{p0} + \beta_p \sum_n^{N_f} f_t \right) + \beta_x x_t. \quad (2k)$$

The system 200 may solve the above optimization problem over the predetermined forecast horizon (e.g., 24 hours at a 15 minute time resolution), and the first value of the solution may be used to set the power consumption of the battery and fans. This process may be repeated every predetermined time interval (e.g., 15 minutes). In the objective function, the terms (2a), (2b), and (2c) may represent the cost of energy comprising the time-of-use (TOU) prices, the demand charge, and the peak demand charge, respectively. The term (2d) corresponds to a small cost to battery and fan operation to prevent ineffectual actions. The term (2e) corresponds to a penalty when air speed over the cattle is below the value needed for effective evaporative cooling when the temperature is above the threshold. The value of $a_{min}$ maybe set to 1.6 m/s when the barn temperature is above the threshold, which signifies that cattle may need to be cooled, and 0 m/s when the barn temperature is below the threshold. Constraints (2f), (2g), and (2h) may limit the battery and fan charging, discharging, and power consumption rates. Constraints (2i) and (2j) model the battery charge capacity dynamics and limitations. Further, constraint (2k) may model the air speed dynamics as provided in Equation (1).

Figure 7:
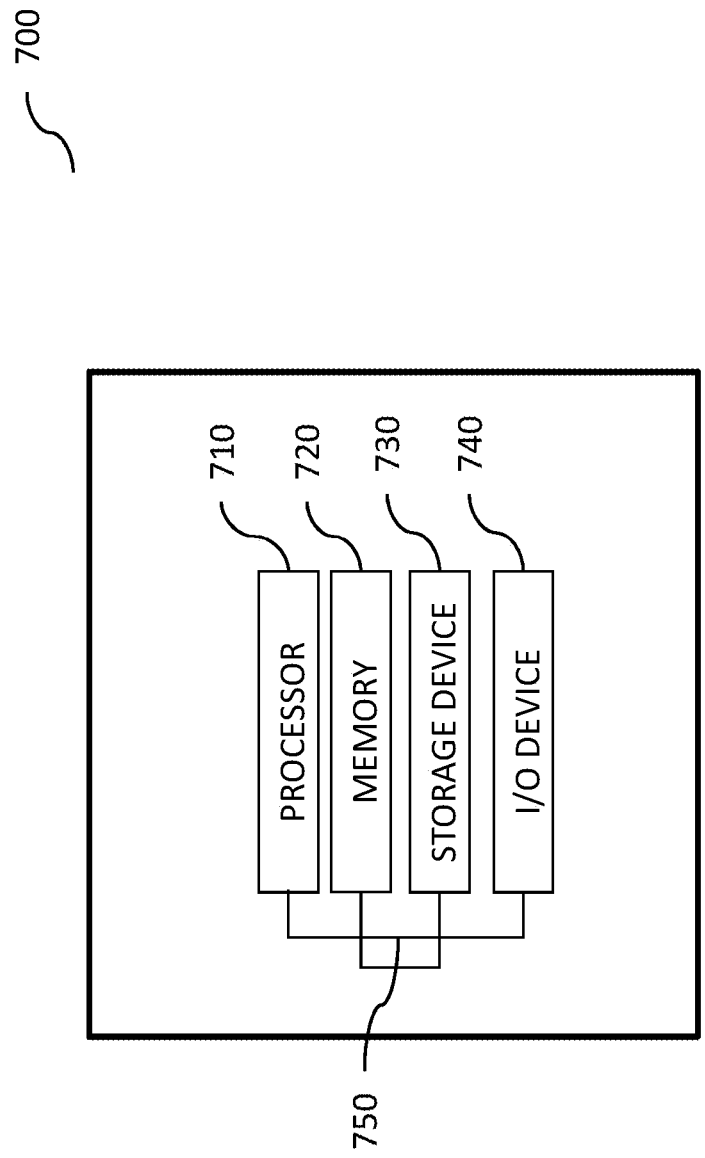
FIG. 7 illustrates an example of a system, according to some implementations of the current subject matter.

In some implementations, the current subject matter may be configured to be implemented in a system 700, as shown in FIG. 7. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

Figure 8:
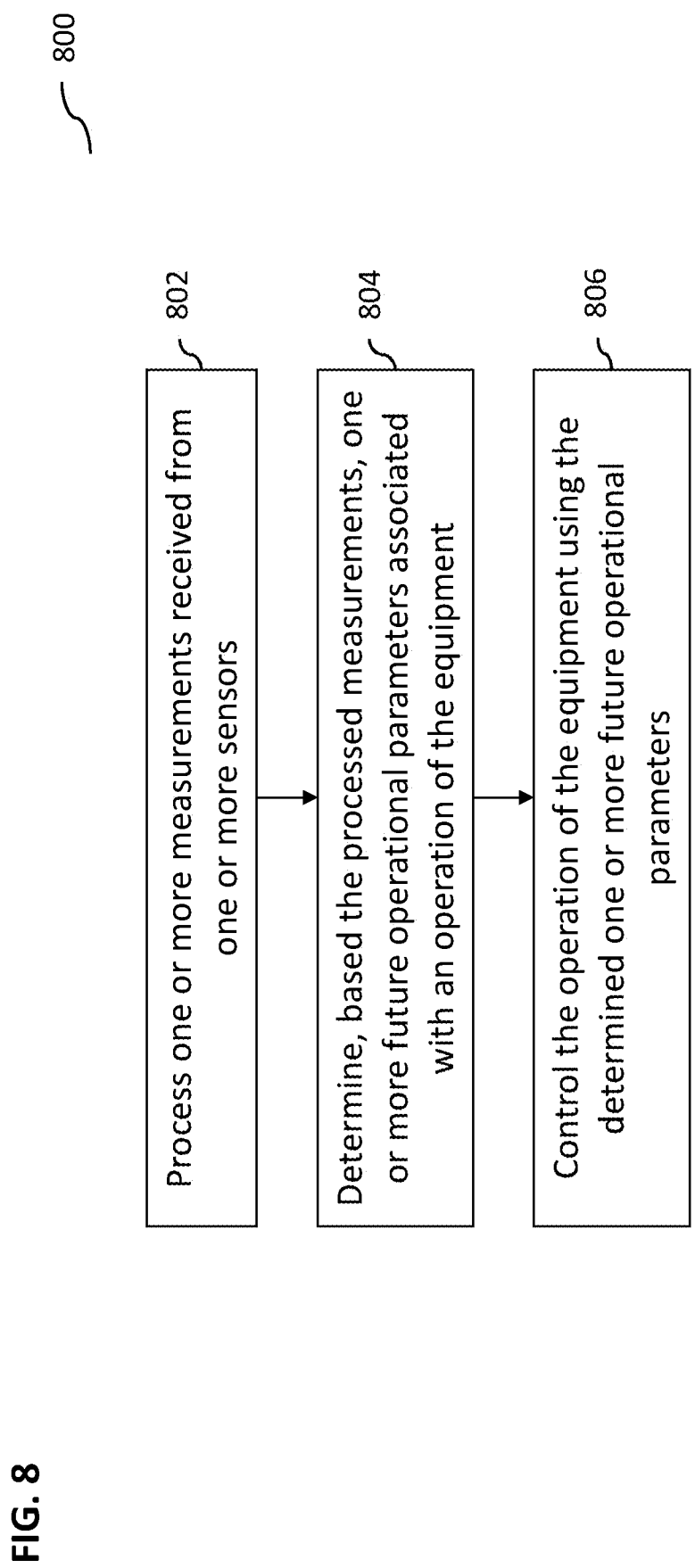
FIG. 8 illustrates an example of a method, according to some implementations of the current subject matter.

FIG. 8 illustrates an exemplary method 800 for managing power consumption of an equipment (e.g., a cooling fan in a barn), according to some implementations of the current subject matter. The process 800 may be configured to be executed by the system 100 shown in FIG. 1, as well as system 200 shown in FIG. 2, including various components shown in FIGS. 3-6, and in particular the cloud-based management system 202 shown in FIG. 2

At 802, the cloud-based management system 202 may process one or more measurements received from one or more sensors (e.g., sensors 208, 216, power meter 219, etc.) communicatively coupled to the cloud-based management system 202. The sensors may monitor and measure at least one of: one or more operational parameters (e.g., fan speed, duration, start/end time, etc.) associated with operation of at least one equipment (e.g., fan), one or more external parameters (e.g., weather, wind (direction/speed), temperature, humidity, luminosity, irradiance, etc.) associated with an environment (e.g., inside the barn, outside the barn, etc.) of the equipment, and one or more power parameters (e.g., how much power is being consumed by the operation of the fan) associated with a power consumption by the equipment.

At 804, the cloud-based management system 202 may determine based the processed measurements, one or more future operational parameters (e.g., how to change operation of the fan based on the detected parameters as discussed above with regard to FIGS. 2-6) associated with an operation of the equipment. For example, the system 202 may be configured to receive data related to wind speed, temperature and humidity outside the barn, temperature and humidity inside the barn, and/or data related to battery storage levels. Using that data, the system 202 may be configured to execute modeling (as discussed above, for instance, with regard to Equations (2a)-(2k)) to determine how to adjust power consumption and/or when the equipment (e.g., the fans) may or may not need to be turned on. These determination may be based on one or more future operational parameters that may be used by the system 200 shown in FIG. 2 to determine operation of its components.

At 806, the cloud-based management system 202 may control the operation of the equipment using the determined future operational parameters. For example, using the determined future operational parameters, one or more fans 212 may be turned on and/or off at a certain time.

In some implementations, the current subject matter may include one or more of the following optional features. The operational parameters may include at least one of the following: an operating speed of the equipment, a duration of the operation of the equipment, a start time of the operation of the equipment, an end time of the operation of the equipment, and any combination thereof.

In some implementations, the external parameters may include at least one of the following: an external temperature corresponding a temperature of air outside of an operational location (e.g., barn) of the equipment, an internal temperature corresponding a temperature of air at the operational location of the equipment, an external humidity corresponding a humidity of air outside of the operational location of the equipment, an internal humidity corresponding a humidity of air at the operational location of the equipment, a wind speed of air outside of the operational location of the equipment, a wind direction of air outside of the operational location of the equipment, a level of solar irradiance outside of the operational location of the equipment, and any combination thereof.

In some implementations, the power parameters may include at least one of the following: a power consumption by the equipment during operation from an electrical grid, a power consumption by the equipment during operation from a stored power source, a power consumption by the equipment during operation from an alternate energy source, and any combination thereof.

In some implementations, the determining operation may include training at least one model using at least one of: one or more operational parameters associated with operation of at least one control equipment, one or more external parameters associated with an environment of the control equipment, and one or more power parameters associated with a power consumption by the control equipment, and any combination thereof, predicting, using the trained model, the future operational parameters associated operation of the equipment based on the processed one or more measurements.

In some implementations, the operational parameters associated with the operation of at least one control equipment may be maximum one or more operational parameters. The external parameters associated with the environment of the control equipment may be maximum one or more external parameters. The power parameters associated with the power consumption by the control equipment may be maximum one or more power parameters.

In some implementations, the determining operation may include determining the future operational parameters associated with the operation of the equipment to reduce a power consumption by the equipment from an electrical grid during operation.

In some implementations, the controlling operation may include providing a control signal to one or more variable frequency drive components to control operation of the equipment based on the determined future operational parameters. The or more variable frequency drive components may be communicatively coupled to and selectively provide power to the equipment from at least one of the following: an electrical grid, a stored power source, an alternate energy source, and any combination thereof. Further, the equipment may be a fan installed in a farming facility configured to house cattle. The alternate energy source may include at least one of the following: a solar panel, a windmill, a hydroelectric station, and any combination thereof.

In some implementations, the current subject matter relates to a system for managing power resources. The system may include at least one equipment configured to consume power to operate, the power being provided to the at least one equipment from at least one power source, the power source including at least one of: an electrical grid, a stored power source, an alternate energy source, and any combination thereof. The system may also include one or more variable frequency drive components configured to be communicatively coupled to the at least one equipment and configured to control operation of the at least one equipment based on one or more future operational parameters. One or more sensors may be configured to be communicatively coupled to at least one of: the at least one equipment and the one or more variable frequency drive components, and configured to monitor and measure at least one of: one or more operational parameters associated with operation of at least one equipment, one or more external parameters associated with an environment of the at least one equipment, and one or more power parameters associated with a power consumption by the at least one equipment. A cloud-based management system may be configured to process one or more measurements received from the one or more sensors, and determine, based the processed one or more measurements, using at least one model, the one or more future operational parameters associated with the operation of the at least one equipment. The cloud-based management system may transmit the determined one or more future operational parameters to the one or more variable frequency drive components. The variable frequency drive components, using the transmitted one or more future operational parameters, may be configured to control operation of the at least one equipment by selectively providing power to the at least one equipment from the at least one power source.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows illustrated in the accompanying figures and/or described herein do not necessarily require the particular order shown, or sequential order, to achieve desirable results. Other implementations can be within the scope of the following claims.

What is claimed:

1. A computer implemented method comprising:
processing, using at least one processor, one or more measurements received from one or more sensors communicatively coupled to the at least one processor, the one or more sensors monitoring and measuring one or more operational parameters associated with operation of at least one equipment located behind a meter at a residential facility or a commercial facility, one or more external parameters associated with an environment of the at least one equipment, and one or more power parameters associated with a power consumption by the at least one equipment;
determining, using the at least one processor and based on the processed one or more measurements, one or more future operational parameters associated with an operation of the at least one equipment located behind the meter at the residential facility or the commercial facility; and
controlling, using the at least one processor, the operation of the at least one equipment located behind the meter at the residential facility or the commercial facility using the determined one or more future operational parameters.

2. The method according to claim 1, wherein the one or more operational parameters include at least one of the following: an operating speed of the at least one equipment, a duration of the operation of the at least one equipment, a start time of the operation of the at least one equipment, an end time of the operation of the at least one equipment, and any combination thereof.

3. The method according to claim 1, wherein the one or more external parameters include an external temperature corresponding a temperature of air outside of an operational location of the at least one equipment, an internal temperature corresponding a temperature of air at the operational location of the at least one equipment, an external humidity corresponding a humidity of air outside of the operational location of the at least one equipment, an internal humidity corresponding a humidity of air at the operational location of the at least one equipment, a wind speed of air outside of the operational location of the at least one equipment, a wind direction of air outside of the operational location of the at least one equipment, and a level of solar irradiance outside of the operational location of the at least one equipment.

4. The method according to claim 1, wherein the one or more power parameters include at least one of the following: a power consumption by the at least one equipment during operation from an electrical grid, a power consumption by the at least one equipment during operation from a stored power source, a power consumption by the at least one equipment during operation from an alternate energy source, and any combination thereof.

5. The method according to claim 1, wherein the determining includes
training at least one model using one or more operational parameters associated with operation of at least one control equipment, one or more external parameters associated with an environment of the at least one control equipment, and one or more power parameters associated with a power consumption by the at least one control equipment; and
predicting, using the trained model, the one or more future operational parameters associated operation of the at least one equipment based on the processed one or more measurements.

6. The method according to claim 5, wherein
the one or more operational parameters associated with the operation of at least one control equipment are maximum one or more operational parameters;
the one or more external parameters associated with the environment of the at least one control equipment are maximum one or more external parameters; and
the one or more power parameters associated with the power consumption by the at least one control equipment are maximum one or more power parameters.

7. The method according to claim 1, wherein the determining includes determining the one or more future operational parameters associated with the operation of the at least one equipment to reduce a power consumption by the at least one equipment from an electrical grid during operation.

8. The method according to claim 1, wherein the controlling includes providing, using the at least one processor, a control signal to one or more variable frequency drive components to control operation of the at least one equipment based on the determined one or more future operational parameters.

9. The method according to claim 8, wherein the one or more variable frequency drive components is communicatively coupled to and selectively provides power to the at least one equipment from an electrical grid, a stored power source, and an alternate energy source.

10. The method according to claim 9, wherein the at least one equipment is at least one fan located at a farming facility configured to house cattle, wherein the at least one fan is controlled to provide evaporative cooling in the farming facility housing the cattle.

11. The method according to claim 9, wherein the alternate energy source includes at least one of the following: a solar panel, a windmill, a hydroelectric station, and any combination thereof.

12. A system comprising:
  at least one programmable processor; and
  a non-transitory machine-readable medium storing instructions that, when executed by the at least one programmable processor, cause the at least one programmable processor to perform operations comprising:
    processing one or more measurements received from one or more sensors communicatively coupled to the at least one programmable processor, the one or more sensors monitoring and measuring one or more operational parameters associated with operation of at least one equipment located behind a meter at a residential facility or a commercial facility, one or more external parameters associated with an environment of the at least one equipment, and one or more power parameters associated with a power consumption by the at least one equipment;
    determining, based on the processed one or more measurements, one or more future operational parameters associated with an operation of the at least one equipment located behind the meter at the residential facility or the commercial facility; and
    controlling the operation of the at least one equipment located behind the meter at the residential facility or the commercial facility using the determined one or more future operational parameters.

13. The system according to claim 12, wherein the one or more operational parameters include at least one of the following: an operating speed of the at least one equipment, a duration of the operation of the at least one equipment, a start time of the operation of the at least one equipment, an end time of the operation of the at least one equipment, and any combination thereof.

14. The system according to claim 12, wherein the one or more external parameters include an external temperature corresponding a temperature of air outside of an operational location of the at least one equipment, an internal temperature corresponding a temperature of air at the operational location of the at least one equipment, an external humidity corresponding a humidity of air outside of the operational location of the at least one equipment, an internal humidity corresponding a humidity of air at the operational location of the at least one equipment, a wind speed of air outside of the operational location of the at least one equipment, a wind direction of air outside of the operational location of the at least one equipment, and a level of solar irradiance outside of the operational location of the at least one equipment.

15. The system according to claim 12, wherein the one or more power parameters include at least one of the following: a power consumption by the at least one equipment during operation from an electrical grid, a power consumption by the at least one equipment during operation from a stored power source, a power consumption by the at least one equipment during operation from an alternate energy source, and any combination thereof.

16. The system according to claim 12, wherein the determining includes
  training at least one model using one or more operational parameters associated with operation of at least one control equipment, one or more external parameters associated with an environment of the at least one control equipment, and one or more power parameters associated with a power consumption by the at least one control equipment, and
  predicting, using the trained model, the one or more future operational parameters associated operation of the at least one equipment based on the processed one or more measurements;
  wherein
    the one or more operational parameters associated with the operation of at least one control equipment are maximum one or more operational parameters;
    the one or more external parameters associated with the environment of the at least one control equipment are maximum one or more external parameters; and
    the one or more power parameters associated with the power consumption by the at least one control equipment are maximum one or more power parameters.

17. The system according to claim 12, wherein the determining includes determining the one or more future operational parameters associated with the operation of the at least one equipment to reduce a power consumption by the at least one equipment from an electrical grid during operation.

18. The system according to claim 12, wherein the controlling includes providing, using the at least one processor, a control signal to one or more variable frequency drive components to control operation of the at least one equipment based on the determined one or more future operational parameters.

19. The method according to claim 8, wherein the one or more variable frequency drive components is communicatively coupled to and selectively provides power to the at least one equipment from an electrical grid, a stored power source, and an alternate energy source;
  wherein the alternate energy source includes at least one of the following: a solar panel, a windmill, a hydroelectric station, and any combination thereof.

* * * * *